United States Patent [19]

Nakanishi

[11] Patent Number: 4,501,785

[45] Date of Patent: Feb. 26, 1985

[54] HYDROPHILIZED MEMBRANE OF POROUS HYDROPHOBIC MATERIAL AND PROCESS OF PRODUCING SAME

[75] Inventor: Hikaru Nakanishi, Kawasaki, Japan

[73] Assignees: Mitsubishi Rayon Co., Ltd.; Senko Medical Instrument Mfg., Co., Ltd., both of Tokyo, Japan

[21] Appl. No.: 516,335

[22] Filed: Jul. 22, 1983

[30] Foreign Application Priority Data

Aug. 2, 1982 [JP] Japan ................... 57-134853

[51] Int. Cl.³ .................................. B32B 3/00
[52] U.S. Cl. .................................. 428/195; 210/500.2; 428/319.9; 521/53; 521/55; 521/88
[58] Field of Search ............ 521/134, 53, 55, 88; 428/195, 319.9; 210/500.2

[56] References Cited

U.S. PATENT DOCUMENTS

| | | | |
|---|---|---|---|
| 3,795,720 | 3/1974 | Schwartz | 521/134 |
| 4,252,907 | 2/1981 | Ogasa | 521/65 |
| 4,394,457 | 7/1983 | Ogasa | 521/905 |

Primary Examiner—Morton Foelak
Attorney, Agent, or Firm—Oblon, Fisher, Spivak, McClelland & Maier

[57] ABSTRACT

A hydrophilized membrane of a porous hydrophobic material having micropores each defined by a surface at least part of which is coated with polyethylene glycol. Water is allowed to pass through the micropores. There is also disclosed a process for hydrophilizing such a porous hydrophobic membrane.

9 Claims, No Drawings

HYDROPHILIZED MEMBRANE OF POROUS HYDROPHOBIC MATERIAL AND PROCESS OF PRODUCING SAME

BACKGROUND OF THE INVENTION

1. Field of the Invention

This invention deals with the art of hydrophilizing a porous hydrophobic membrane.

2. Prior Art

In recent years, hydrophobic membranes made of polyethylene, polypropylene, polytetrafluoroethylene or the like have now been used in an artificial kidney, plasmapheresis and various kinds of water treatments since they have excellent chemical resistance and microbial resistance.

Although these hydrophobic membranes are porous, water and blood plasma, if not subjected to a high pressure, are not allowed to pass through or permeate them. Therefore, such hydrophobic membranes under consideration need to be hydrophilized to allow water and blood plasma to permeate it.

One method of hydrophilizing such a porous hydrophobic membrane has been to first pass a liquid such as alcohol through the pores of the membrane and then to replace this liquid by water. With this method, so long as the water is present in the pores of the hydrophobic membrane, the water is allowed to pass through the pores of the membrane either freely or under a small pressure, depending on the size of the pores of the hydrophobic membrane. However, once the water is removed from the pores of the hydrophobic membrane so that the pores become dry either partially or entirely and are filled with air, the hydrophilized hydrophobic membrane is rendered hydrophobic again, and the water is not allowed to pass through the pores of the membrane if it is not subjected to a high pressure. Thus, when the hydrophobic membrane is hydrophilized with this conventional method, it must be always kept in contact with water to maintain a hydrophilic nature. This is not desirable from the viewpoint of practical use.

When a porous hydrophobic membrane of the type described above is used for the treatment of blood, it is necessary that the membrane should be subjected to sterilization. In the case of ethylene oxide gas sterilization, the membrane has to be hydrophilized while it is maintained in a sterilized state. This procedure is cumbersome. Also, in the case of formalin sterilization using an aqueous solution of formalin, a blood treatment device incorporating a hydrophobic membrane unit must be washed to remove the residual formalin solution before the blood treatment is carried out. In this case, once the formalin solution is discharged from the blood treatment device to effect a subsequent washing, the air is introduced into the pores of the hydrophobic membrane to lower the liquid permeability for the reasons mentioned above. Therefore, it is necessary that the formalin solution in the blood treatment device should be replaced by a washing water in such a manner that the air will not be introduced into the pores of the hydrophobic membranes. This procedure is also troublesome and requires much time and labor.

SUMMARY OF THE INVENTION

It is therefore an object of this invention to provide a hydrophilized membrane of a porous hydrophobic material which exhibits a hydrophilic nature even if the air is introduced into the micropores of the membrane.

Another object is to provide a process of producing such a membrane.

According to the present invention, there is provided a hydrophilized membrane of a porous hydrophobic material having micropores each defined by a surface at least part of which is coated with polyethylene glycol.

The porous hydrophobic membrane is first brought into contact under a predetermined pressure with a pretreatment liquid which has an affinity for the hydrophobic membrane and can be mixed with polyethylene glycol substantially homogeneously so that the micropores are filled with the pretreatment liquid. Then, the liquid in the micropores is substituted by polyethylene glycol or an aqueous solution thereof so that the surface of each micropore is coated with the polyethylene glycol, thereby imparting a hydrophilic nature to the hydrophobic membrane. Alternatively, the porous hydrophobic membrane is treated by a mixture of the pretreatment liquid and polyethylene glycol to effect the hydrophilization.

DESCRIPTION OF THE PREFERRED EMBODIMENTS OF THE INVENTION

Any kinds of porous hydrophobic membranes having micropores can be used to provide a hydrophilized membrane according to the present invention. Among them, porous hydrophobic membranes made of polyolefin such as polyethylene and polypropylene and substituted polyolefin such as polytetrafluoroethylene are preferred.

These porous hydrophobic membranes, when left intact, will not allow water to pass therethrough. When the surface or wall of each micropore of the membrane is coated with polyethylene glycol, water is allowed to pass through the micropores thanks to the hydrophilic nature of polyethylene glycol, so that a hydrophilic nature is imparted to the porous hydrophobic membrane.

It is preferred that the surface of each micropore should be coated entirely with polyethylene glycol, but the micropore surface may be partially coated with polyethylene glycol so long as a required amount of water can be allowed to pass through each micropore.

Even if it is intended to apply either polyethylene glycol or an aqueous solution of polyethylene glycol directly to the surface of each micropore of the porous hydrophobic membrane, for example, by immersion, the polyethylene glycol or the aqueous solution thereof will not be introduced into the micropores. Therefore, the porous hydrophobic membrane is first treated by a pretreatment liquid which has an affinity for the hydrophobic membrane and can be mixed with polyethylene glycol substantially homogeneously. Then, the hydrophobic membrane is treated by polyethylene glycol or an aqueous solution thereof so that the surface of each micropore of the hydrophobic membrane can be coated with the polyethylene glycol. Also, the membrane can be treated by a mixture of the pretreatment liquid and polyethylene glycol. In this case, preferably the ratio of the pretreatment liquid to polyethylene glycol is in the range of 19/1 to 1/19, and most preferably in the range of 10/1 to 3/17.

As the liquid which has an affinity for the hydrophobic membrane and can be mixed with polyethylene glycol substantially homogeneously, there can be used alcohol such as methyl alcohol, ethyl alcohol, isopropyl alcohol and ethylene glycol, aromatic hydrocarbon, chloroform, acetone, carbon tetrachloride and a mixture of two or more of these materials.

In the case where the hydrophobic membrane is used for a medical treatment, it is preferred that the liquid is highly volatile and is not harmful to a human body if it is transferred to the human body during the medical treatment. Therefore, in such a case, ethyl alcohol, methyl alcohol and isopropyl alcohol are preferred.

Such alcohol may have a concentration of 100% or may be used as an aqueous solution thereof. In the case of the aqueous solution, preferably its concentration is not less than 10%, and most preferably the concentration is not less than 50%. When the concentration of alcohol is less than 10%, it requires more time to hydrophilize the porous hydrophobic membrane.

Since there is a possibility that the polyethylene glycol used for the hydrophilization of the porous hydrophobic membrane is transferred to the human body during the medical treatment, the polyethylene glycol should preferably be of the pharmaceutical type which is not harmful to a human body if it is transferred to the human body.

An example of polyethylene glycol used herein is one which is in a liquid state at a room temperature, such as macrogolum 400 and macrogolum 600 both of which are Japanese pharmaceutical polyethylene glycol. Such polyethylene glycol may have a concentration of 100% or may be used as an aqueous solution thereof or as a mixture thereof with the pretreatment liquid.

Polyethylene glycol which has a higher molecular weight and is in a solid state at a room temperature, such as macrogolum 1500 and macroglum 6000 both of which are Japanese pharmaceutical polyethylene glycol, can be suitably used to provide an aqueous solution thereof. The concentration of the polyethylene glycol should preferably be not less than 1%, and more preferably the concentration is not less than 5%. Further, most preferably the concentration is not less than 20%.

Instead of polyethylene glycol, glycol such as ethylene glycol and propylene glycol and a surface-active agent may be used. However, these materials can not be completely washed away easily with water, and therefore the residual material is present in the resultant hydrophilized porous hydrophobic membrane. Clearly, this is not desirable from the viewpoint of toxicity, and such a membrane is not suitable for use in medical treatments and in a water treatment to provide drinking water.

The invention will now be described by way of the following examples in which hydrophobic hollow fiber membranes are hydrophilized. However, any other shape of hydrophobic membranes such as a film type and a tubular type can be hydrophilized.

EXAMPLE 1

There was provided a liquid treatment device comprising a hollow housing having a pair of inlet and outlet ports for a liquid to be treated such as blood and water and at least one outlet for the liquid permeated, and a bundle of hollow fibers disposed within the housing with the opposite ends thereof being in liquid communication with the inlet and outlet ports, respectively. Each hollow fiber was made of a microporous polyethylene membrane and had an internal diameter of 270 $\mu$m, a thickness of 60 $\mu$m and a pore size of 0.4 to 2 $\mu$m. The total membrane area of the hollow fibers was 0.65 mm$^2$. Pharmaceutical ethyl alcohol was caused to flow through each hollow fiber of the fiber bundle at a rate of 100 ml per minute to replace the air in the hollow fiber so that the ethyl alcohol passed through the micropores of the fiber. The ethyl alcohol was introduced from the inlet port of the housing and was discharged from the outlet port of the housing. After no bubble was recognized in the fiber bundle, the ethyl alcohol was further caused to flow through the fiber bundle for three minutes to hydrophilize each fiber. Then, pharmaceutical polyethylene glycol (macrogolum 400 having an average molecular weight of 400) was caused to flow through each hollow fiber of the fiber bundle for five minutes at a rate of 100 ml per minute to replace the ethyl alcohol. Then, the polyethylene glycol was discharged from the fiber bundle under the influence of gravity. Then, the fiber bundle was left as it was for two weeks. Then, water was caused to flow the fiber bundle. At that time, a water permeability of the fiber was 2 l/m$^2$.hr.mm Hg.

COMPARATIVE EXAMPLE 1

Using a liquid treatment device described in Example 1, alcohol was caused to flow through each hollow fiber of a fiber bundle according to the procedure of Example 1 to hydrophilize each hollow fiber. Then, the alcohol in the fiber bundle was replaced by water in such a manner that no air was introduced into the fiber bundle. In this condition, water was caused to flow through the fiber bundle. At that time, a water permeability of the hollow fiber was 2 l/m$^2$.hr.mm Hg. Then, the feed of water to the liquid treatment device was stopped, and the water was discharged from the liquid treatment device under the influence of gravity. Then, the fiber bundle was left as it was for three days. Then, water was caused to flow through the fiber bundle. At that time, no water permeated each fiber.

EXAMPLE 2

A hydrophilization test was carried out according to the procedure of Example 1 except that the pharmaceutical ethyl alcohol and the polyethylene glycol (the macrogolum 400) were replaced by a 70% aqueous solution of pharmaceutical ethyl alcohol and a 10% aqueous solution of polyethylene glycol (macrogolum 6000), respectively. Then, blood of a cow was caused to flow through a fiber bundle at a rate of 100 ml per minute. The blood plasma permeated the fibers at a rate of 30 ml per minute.

EXAMPLE 3

A hydrophilization test was carried out according to the procedure of Example 1 except that a fiber bundle comprised hollow fibers each made of a microporous polypropylene membrane. Each hollow fiber had an internal diameter of 100 $\mu$m, a thickness of 22.5 $\mu$m and a pore size of 0.02 to 0.12 $\mu$m. After the fiber bundle was subjected to the hydrophilization, it was left as it was for two weeks. Then, water was caused to flow the fiber bundle. At that time, a water permeability of the fiber was 0.5 l/m$^2$.hr.mm Hg.

EXAMPLE 4

Using a liquid treatment device described in Example 1, a mixture of pharmaceutical ethyl alcohol and polyethylene glycol (macrogolum 400) was caused to flow through each fiber at a rate of 100 ml per minute to replace the air in the hollow fiber. The mixture ratio of the pharmaceutical ethyl alcohol to polyethylene glycol was ⅓. Then, the mixture was discharged from the fiber bundle under the influence of gravity. Then, the fiber bundle was left as it was for two weeks. Then, water was caused to flow through the fiber bundle. At that time, a water permeability of the fiber was 2 $l/m^2 \cdot hr \cdot mm\ Hg$.

What is claimed is:

1. A hydrophilized, microporous membrane consisting of a hydrophobic material, said membrane having micropores therethrough, and said membrane having at least a portion of the surfaces thereof coated with polyethylene glycol.

2. The membrane of claim 1, wherein the entire surface of each micropore of said membrane is coated with polyethylene glycol.

3. The membrane of claim 1, wherein said hydrophobic material is a polyolefin or a substituted polyolefin.

4. The membrane of claim 1, wherein the pore size of said micropores ranges from 0.4 $\mu m$ to 2 $\mu m$.

5. A hydrophilized, microporous membrane of a hydrophobic material prepared by a process, comprising:
    (a) preparing a porous membrane from a polymer material consisting of a hydrophobic polymer;
    (b) pretreating the pores of said membrane with an organic solvent or aqueous solution thereof which has an affinity for the hydrophobic membrane;
    (c) treating the pores of the pretreated membrane with polyethylene glycol or an aqueous solution of polyethylene glycol, thereby preparing a membrane, the surfaces of the pores which permeate said membrane being at least partially coated with polyethylene glycol.

6. The membrane of claim 5, wherein the liquid of the pretreatment step of claim 5 is an organic solvent solution of polyethylene glycol.

7. The membrane of claim 6, wherein the ratio of organic solvent to polyethylene glycol in said pretreatment liquid is in the range of 19/1 to 1/19.

8. The membrane of claim 5, wherein said organic solvent which has an affinity for said hydrophobic membrane is selected from the group consisting of methyl alcohol, ethyl alcohol, isopropyl alcohol, ethylene glycol, an aromatic hydrocarbon, chloroform, acetone, carbon tetrachloride or a mixture of two or more of these solvents.

9. A hydrophilized, microporous membrane of a hydrophobic material prepared by a process, consisting essentially of:
    (a) preparing a porous membrane from a hydrophobic polymer;
    (b) pretreating the pores of said membrane with an organic solvent or aqueous solution thereof which has an affinity for the hydrophobic membrane;
    (c) treating the pores of the pretreated membrane with polyethylene glycol or an aqueous solution of polyethylene glycol, thereby preparing a membrane, the surfaces of the pores which permeate said membrane being at least partially coated with polyethylene glycol.

* * * * *